United States Patent [19]

Romero et al.

[11] Patent Number: 4,471,034
[45] Date of Patent: Sep. 11, 1984

[54] ALLOY COATING FOR CAST IRON PARTS, SUCH AS GLASS MOLDS

[75] Inventors: Eduardo Romero, Coram; Richard J. Dumola, Centerreach, both of N.Y.

[73] Assignee: Eutectic Corporation, Flushing, N.Y.

[21] Appl. No.: 442,169

[22] Filed: Nov. 16, 1982

[51] Int. Cl.³ .............................................. B32B 15/18
[52] U.S. Cl. .................................... 428/679; 249/135; 264/338; 428/937
[58] Field of Search ............................... 428/678-682, 428/937, 939; 264/338; 249/135

[56] References Cited

U.S. PATENT DOCUMENTS

| 2,499,827 | 3/1970 | Kihlgren | 428/939 |
| 3,194,642 | 7/1965 | Bates et al. | 428/939 |
| 4,263,353 | 4/1981 | Patel | 428/937 |

FOREIGN PATENT DOCUMENTS 2438923 11/1975 Fed. Rep. of Germany ...... 428/937

OTHER PUBLICATIONS

Henderson, J. G. et al.; *Metallurgical Dictionary*, Reinhold Pub. Corp., pp. 60-61 (1953).

*Primary Examiner*—Michael L. Lewis
*Attorney, Agent, or Firm*—Hopgood, Calimafde, Kalil, Blaustein & Judlowe

[57] ABSTRACT

A method for producing a weld-bonded nickel-base alloy coating on a cast iron part with minimum porosity at the weld interface is provided using a plasma transferred arc process in which the cast iron part is electrically coupled to the plasma-forming circuit, the flow of powder being directed into the plasma arc to the surface of the cast iron part. The method further resides in controlling the deposit of the nickel-base alloy during spraying to maintain a puddle of the alloy between the transfer arc plasma and the cast iron part substrate to protect it from overheating and burning from the transfer arc while promoting a welding reaction between the puddle and the cast iron substrate. The plasma spraying is continued progressively along the cast iron substrate to be coated while maintaining the alloy puddle between the plasma arc and the cast iron until completion of the coating thereof. The invention also relates to a composite article of manufacture.

4 Claims, 5 Drawing Figures

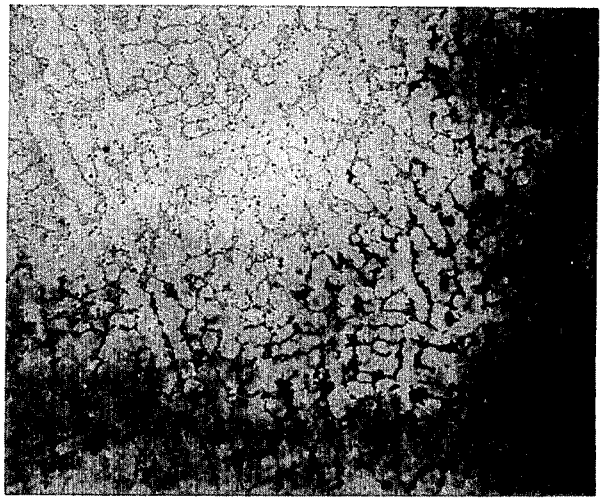
FIG. 4    x 250
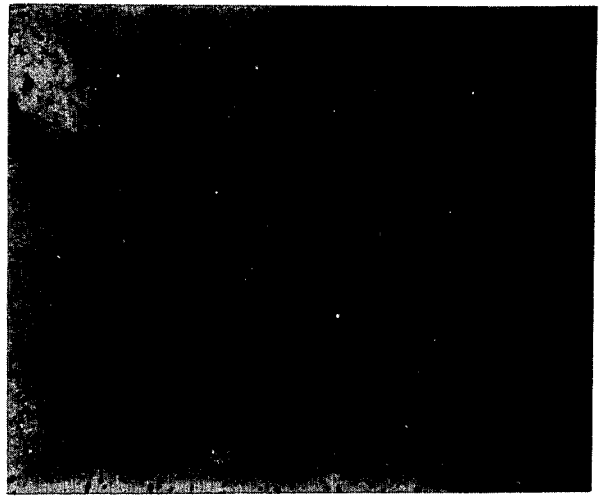
FIG. 5    x 250

ALLOY COATING FOR CAST IRON PARTS, SUCH AS GLASS MOLDS

This invention relates to a nickel-base coating alloy for cast iron parts and to a method of coating cast iron parts, such as glass mold parts. The invention also relates to composite articles produced by the method.

STATE OF THE ART

Cast iron is defined on page 7 of the ASM Metals Handbook (Vol. 1, 8th Edition, 1961) as an iron containing carbon in excess of the solubility in the austenite phase that exists in the alloy at the eutectic temperature. The term "cast iron" employed hereinafter includes gray cast iron, white cast iron, malleable iron and nodular iron. Cast irons generally contain in excess of 1.5% carbon by weight. For example, gray cast iron may contain 1.7 to 4.5% C and 1 to 3% Si. Malleable iron may contain from about 2 to 2.65% C and 0.9 to 1.65% Si, among other elements. The composition of unalloyed nodular or ductile cast iron is similar to gray cast iron. A known composition of nodular iron is one containing by weight 3.2 to 4.1% C, 1.8 to 2.8% Si, up to 0.8% Mn, 0.1% max phosphorus and 0.03% max sulfur. Generally speaking, the carbon content may range from about 2 to 4.5%.

It is known to form glass by shaping highly viscous molten glass in metal molds until the glass cools sufficiently to enable removal of the molded glass shape therefrom. Because molten glass has a tendency to adhere to a metal mold and because the surface of the mold in contact with the molten glass has a tendency to wear if not lubricated, a release agent is generally coated on the inside surface of the mold to aid in the release of the molded glass article and to some extent reduce wear. This is particularly a problem where the molten glass has a temperature of about 1800° F. to 2200° F. At these temperatures, however, the release agent tends to vaporize and the mold part in contact with hot glass therefore may wear rapidly.

Glass-forming equipment, such as blank molds, blow molds, neck-rings, plungers, baffles, bottom plates, etc., are largely made of cast iron. Cast iron is subject to wear under the conditions discussed hereinabove. It would be desirable to provide a method of depositing a hard, wear resistant dense metal coating on glass mold parts employing a welding technique to render the cast iron part more resistant to wear at elevated glass molding temperatures. However, a disadvantage of producing welded coatings on cast iron is the tendency at the elevated welding temperatures for the free carbon in the cast iron to react with air adjacent to the weld to form gases, such as $CO_2$, which produce highly porous deposits having inferior metallurgical properties.

OBJECTS OF THE INVENTION

One object of the invention is to provide a method for producing a weld-bonded nickel-base alloy coating on a cast iron part.

Another object is to provide a nickel-base alloy powder for use in producing a dense spray-weld coating weld-bonded to a cast iron surface.

A further object is to provide as a composite article of manufacture an alloy-coated cast iron part produced from a titanium-containing nickel-base alloy.

A still further object is to provide a cast iron glass mold part coated with a nickel-base alloy.

These and other objects will more clearly appear when taken in conjunction with the following disclosure, the claims and the accompanying drawings, wherein:

FIGS. 4 and 5 are representations of photomicrographs showing the cross section of the nickel-base alloy coating after being weld-bonded to a cast iron surface.

SUMMARY OF THE INVENTION

Figure 1:
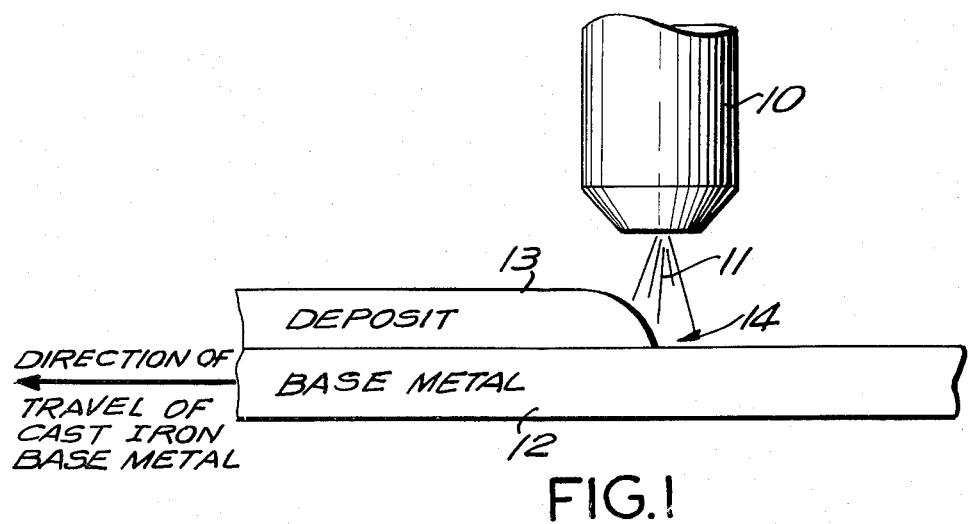
FIGS. 1 and 2 are schematic representations of plasma transferred arc welding outside and within the invention, respectively, as applied to a cast iron surface.

One embodiment of the invention resides in a method of producing a weld-bonded nickel-base alloy coating on a cast iron part with minimum porosity at the weld interface. The method comprises the application of a powder of an alloy consisting essentially of about 0.5 to 5% Ti, about 0.5 to 5% Si, 0 to about 5% B, 0 to about 2% Mn, 0 to about 1% Al, 0 to about 5% Fe, 0 to about 15% Cr, 0 to about 0.5% C, and the balance essentially nickel using the plasma transfer arc process with the cast iron part electrically coupled to the plasma-forming circuit as the anode thereof, the flow of powder being directed by carrier gas into said plasma arc to the surface of the cast iron part. The deposit of the alloy is controlled during spraying to maintain a puddle of the alloy between the transfer arc plasma and the cast iron part substrate to protect it from excessive melting from the transfer arc while promoting a welding reaction between the puddle and the cast iron substrate. The plasma spraying is continued progressively along the cast iron substrate being coated while maintaining the alloy puddle between the plasma arc and the cast iron substrate until completion of the coating thereof, whereby a dense weld-bonded nickel-base alloy coating is obtained characterized by a microstructure having a fine distribution of secondary titanium carbide formed by reaction of the titanium in the alloy with carbon in the cast iron.

Another embodiment of the invention is directed to a composite article of manufacture comprising an alloy-coated cast iron part, the alloy coating being a nickel-base alloy consisting essentially of about 0.5 to 5% Ti, about 0.5 to 5% Si, 0 to about 5% B, 0 to about 2% Mn, 0 to about 1% Al, 0 to about 5% Fe, 0 to about 15% Cr, 0 to about 0.5% C and the balance essentially nickel weld-bonded to the cast iron part and characterized by a microstructure containing a fine distribution of secondary titanium carbide formed by reaction of titanium in the alloy with carbon in the cast iron.

A further embodiment comprises a cast iron glass mold part having weld-bonded to at least a part of the surface thereof that contacts molten glass a nickel-base alloy coating consisting essentially of about 0.5 to 5% Ti, about 0.5 to 5% Si, 0 to about 5% B, 0 to about 2% Mn, 0 to about 1% Al, 0 to about 5% Fe, 0 to about 15% Cr, 0 to about 0.5% C and the balance essentially nickel, the alloy coating being weld-bonded to the glass mold part and being characterized by microstructure containing a fine distribution of secondary titanium carbide formed by reaction of titanium in the alloy with carbon in the cast iron glass mold part.

A preferred nickel-base alloy coating is one containing about 0.5 to 3% Ti, about 0.5 to 3% Si, about 0.5 to 2% B, about 1% max Mn, about 1% max Al, about 0.5 to 3% Fe, 0 to about 10% Cr, about 0.05 to 0.3% C, and the balance essentially nickel.

DETAILS OF THE INVENTION

The coating alloy is preferably an atomized powder characterized by an average particle size falling within the range of about 44 to 177 microns (325 mesh to 80 mesh U.S. Standard).

The microhardness of the deposited alloy ranges from about Rockwell HRB 80 to HRC 35 and, by virtue of the dispersion of secondary titanium carbide through the weld deposit, exhibits excellent wear resistance. The use of titanium as an alloying addition is very important because of its strong affinity for carbon and for nitrogen. In order to insure a dense weld deposit it is important that the coating technique be carried out under conditions to avoid excessive melting of the cast iron substrate and thus reaction of the cast iron interface at the weld with oxygen in the air and thereby the oxidation of the free carbon in the cast iron to $CO_2$ which renders the weld deposit porous and metallurgically inferior as a protective coating.

To avoid weld porosity, the plasma arc is controlled by maintaining a puddle of the deposited alloy between the plasma arc and the cast iron substrate, whereby overheating of the substrate is inhibited and the oxidation of free carbon in the cast iron minimized. This is illustrated by FIGS. 1 and 2.

The method illustrated by FIG. 1 is undesirable as will be clearly apparent from the following description. The plasma nozzle 10 is shown depositing powder via plasma arc 11 onto base metal (cast iron) 12. A deposit 13 in the form of a puddle is formed with the plasma arc 11 leading the puddle to the extent that a good portion of the plasma arc strikes the cast iron substrate at 14.

Figure 2:
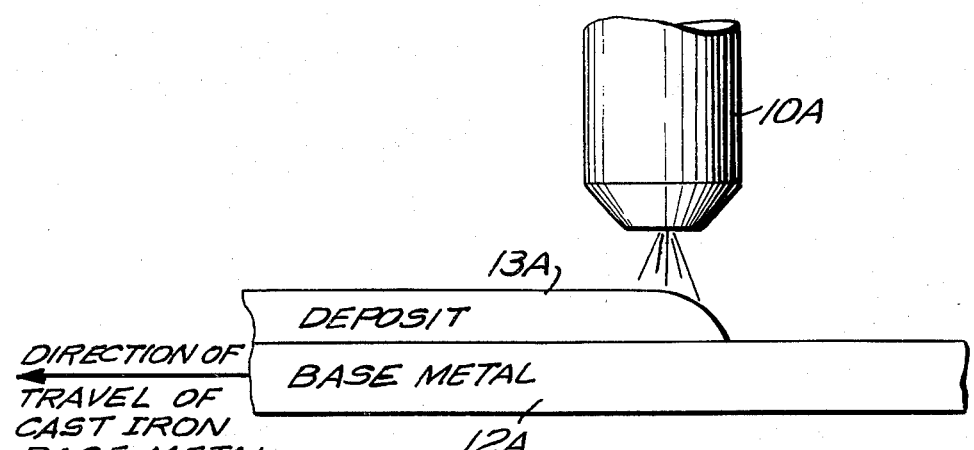

On the other hand, FIG. 2 shows that by controlling the plasma arc and the relative rate of travel between the nozzle 10A and the workpiece, that is, by either moving the workpiece relative to the nozzle or by moving the nozzle relative to the workpiece, a puddle 13A of the coating alloy can be maintained and positioned relative to the nozzle such that it takes substantially the full brunt of the plasma arc and protects the substrate against direct contact with the arc.

Figure 3:
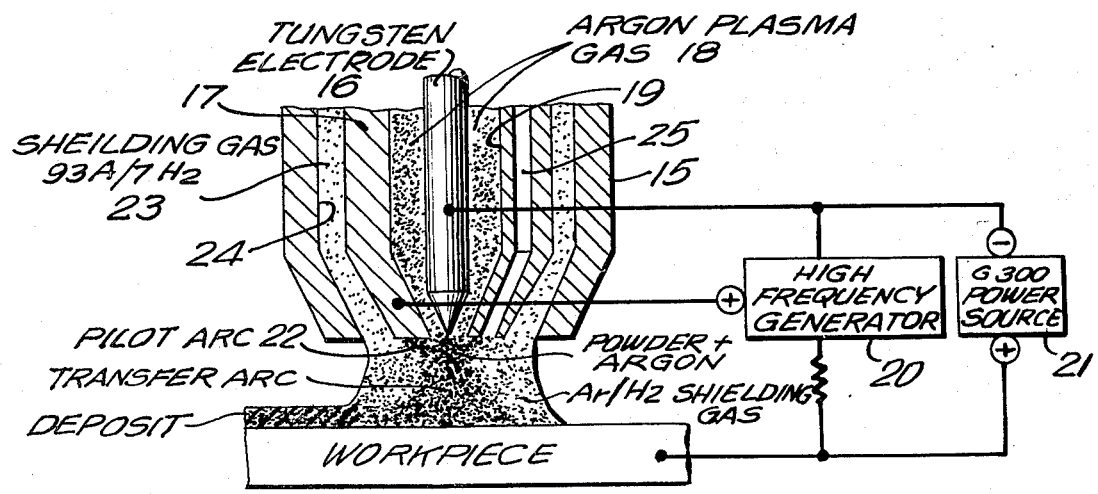
FIG. 3 depicts a cross section of a plasma transferred arc nozzle and a block diagram of an electrical circuit coupled to the nozzle and the metal substrate being coated using the plasma transfer arc technique of coating.

The transfer arc relationship between the plasma torch and the workpiece (cast iron) is shown in the schematic and block diagram of FIG. 3 which depicts in cross section plasma torch 15 comprising a center tungsten electrode 16 surrounded by a water-cooled annular copper electrode 17. Argon plasma gas 18 is passed through the annular space 19 between the tungsten electrode 16 which is the cathode and the copper electrode 17 which is the anode. Referring to the block diagram to the right of the torch, the tungsten electrode 16 is shown coupled to the negative post of high frequency generator 20 which is connected in parallel with power source 21. Similarly, copper anode 17 is coupled to the positive post of the high frequency generator and the power source with the workpiece also coupled as the anode to assure the formation of the transfer arc.

A pilot arc 22 is formed at the end of the nozzle between the tungsten and copper electrodes which ionizes the argon gas 18 passing through the annular space around the tungsten electrode and initiates the transfer arc which is attracted to the workpiece by the higher potential of the workpiece which is the anode.

A shielding gas of either 93% argon plus 7% hydrogen 23 or argon is also provided flowing through the outer annular space 24. A separate supply of argon gas serves as the carrier and directs the powder through ports 25 into the plasma arc. The shielding gas aids in preventing oxidation of the deposit, which deposit just opposite the nozzle in turn protects the case iron substrate from direct contact with the high temperature transfer arc. It should be added that the $Ar/H_2$ mixture is preferred as its use also improves the wettability of the molten alloy to the substrate. The details of the transfer arc system need not be further described. The system preferably employed is that referred to as the Eutronic Gap (tradename) process which utilizes the Eutronic Gap transferred arc torch sold by the Eutectic Corporation of Flushing, N.Y.

In carrying the invention into practice, the following nickel-base alloy compositions were deposited using the Eutronic Gap transferred arc system.

| Alloy No. | % Ti | % Si | % B | % Mn | % Al | % Fe | % Cr | % C | % Ni |
|---|---|---|---|---|---|---|---|---|---|
| 1 | 1.7 | 1.5 | 1.0 | .12 | .12 | 1.6 | 5.0 | .17 | bal. |
| 2 | 2.76 | .005 | — | .24 | .23 | .05 | — | .05 | bal. |
| 3 | 0.8 | 1.8 | 1.0 | 1.5 | 0.8 | 1.1 | — | .15 | bal. |
| 4 | 1.1 | 0.9 | 0.8 | 0.8 | 0.8 | 1.1 | — | .13 | bal. |

The process described for FIG. 3 was employed in the coating of a glass mold baffle made of cast iron (ductile or nodular cast iron). The nozzle was held a distance of 10 mm from the workpiece. The powder was fed at a rate of 4.5 lbs/hour in a carrier gas of argon delivered at a pressure of 20 psi (gage), the ionized gas being pure argon also delivered at a pressure of 60 psi, the shielding gas being 93% argon—7% hydrogen delivered at 60 psi. A coating was produced of each of the alloy compositions.

Inspection of each of the alloy coatings (Alloy Nos. 1-4) showed the deposit to be very dense, strongly weld-bonded to the cast iron substrate, and substantially free of gas pockets or porosity. The microstructures of Alloy Nos. 1 and 2 also showed that the titanium in the alloy reacted with the free carbon in the cast iron to form a fine dispersion of titanium carbide through the nickel-base alloy matrix (note FIGS. 4 and 5).

The hardness of each of the coatings fell within the range of about HRB 80 to HRC 35 Rockwell C as follows:

| Alloy No. | Rockwell Hardness |
|---|---|
| 1 | HRC 28 |
| 2 | HRB 80 |
| 3 | HRC 35 |
| 4 | HRC 20 |

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. As a composite article of manufacture, an alloy-coated cast iron substrate, said cast iron substrate containing in excess of 1.5% carbon by weight, said alloy coating being produced on said cast iron substrate by the plasma transfer arc welding of a nickel-base alloy consisting essentially of about 0.5 to 5% Ti, about 0.5 to 5% Si, 0 to about 5% B, 0 to about 2% Mn, and containing carbon by the thermal diffusion thereof from said cast iron, and the balance essentially nickel, said nickel-base alloy being deposited by maintaining a puddle of said alloy between the transfer arc plasma and the cast iron substrate such that carbon from said substrate diffuses into the deposited alloy and reacts with contained titanium to form a fine precipitate of secondary titanium carbide, said alloy coating being weld-bonded to said cast iron substrate and characterized by being substantially free of gas pockets or porosity and further characterized by a microstructure containing a fine dispersion of said secondary titanium carbide through said nickel base alloy coating.

2. As a composite article of manufacture, an alloy-coated cast iron glass mold part, said cast iron part containing in excess of 1.5% carbon by weight and having weld-bonded to at least a part of the surface thereof that contacts molten glass, a nickel-base alloy coating, said alloy coating being produced on said cast iron part by the plasma transfer arc welding of said nickel-base alloy consisting essentially of about 0.5 to 5% Ti, about 0.5 to 5% Si, 0 to about 5% B, 0 to about 2% Mn, and containing carbon by the thermal diffusion thereof from said cast iron, and the balance essentially nickel, said nickel-base alloy being deposited by maintaining a puddle of said alloy between the transfer arc plasma and the cast iron part such that carbon from said substrate diffuses into the deposited alloy and reacts with contained titanium to form a fine precipitate of secondary titanium carbide, said alloy coating being weld-bonded to said cast iron part and characterized by being substantially free of gas pockets or porosity and further characterized by a microstructure containing a fine dispersion of said secondary titanium carbide through said nickel base alloy coating.

3. The alloy-coated cast iron substrate of claim 1. wherein the alloy contains by weight about 0.5 to 3% Ti, about 0.5 to 3% Si, about 0.5 to 2% B, about 1% max Mn, about 1% max Al, about 0.5 to 3% Fe and 0 to about 10% Cr and the balance essentially nickel.

4. The alloy coated cast iron glass mold of claim 2, wherein the alloy contains by weight about 0.5 to 3% Ti, about 0.5 to 3% Si, about 0.5 to 2% B, about 1% max Mn, about 1% max Al, about 0.5 to 3% Fe and 0 to about 10% Cr and the balance essentially nickel.

* * * * *